(12) United States Patent
Allen

(10) Patent No.: US 10,768,390 B2
(45) Date of Patent: Sep. 8, 2020

(54) MOUNTING SYSTEM AND KIT FOR AERIAL MOUNTING OF A FIBER OPTIC ENCLOSURE

(71) Applicant: COMMSCOPE TECHNOLOGIES LLC, Hickory, NC (US)

(72) Inventor: Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 192 days.

(21) Appl. No.: 15/907,599

(22) Filed: Feb. 28, 2018

(65) Prior Publication Data
US 2018/0188468 A1 Jul. 5, 2018

Related U.S. Application Data

(63) Continuation of application No. 14/960,687, filed on Dec. 7, 2015, now Pat. No. 9,939,602.

(60) Provisional application No. 62/089,492, filed on Dec. 9, 2014.

(51) Int. Cl.
*G02B 6/48* (2006.01)
*G02B 6/44* (2006.01)

(52) U.S. Cl.
CPC ............ *G02B 6/483* (2013.01); *G02B 6/4439* (2013.01)

(58) Field of Classification Search
CPC ........ G02B 6/483; G02B 6/4439; G02B 6/48; H02G 7/053; H02G 7/00; H02G 7/05; H02G 7/12; H02G 7/20; H01B 9/008; H01B 11/007; B60M 1/23; B60M 1/20; B60M 1/24

USPC ........................................... 248/218.4–219.3
See application file for complete search history.

(56) References Cited

U.S. PATENT DOCUMENTS

| 1,448,141 A | 3/1923 | Manz et al. |
| 2,252,820 A | 8/1941 | Tallman |
| 2,524,916 A | 10/1950 | Loos |

(Continued)

FOREIGN PATENT DOCUMENTS

| DE | 38 03 335 A1 | 8/1989 |
| EP | 2 128 505 A2 | 12/2009 |

OTHER PUBLICATIONS

"AIR FOSC, Aerial Fiber Optic Splice Closure," Tyco Electronics, 2005, 2 pp.
"AIR FOSC, Aerial Fiber Optic Splice Closure," TE Connectivity, www.te.com/TelecomNetworks, Sep. 2013, 4 pp.
AIR FOSC B, Aerial In-Line Re-Enterable Fiber Optic Splice Closure, Tyco Electronics, 1999, 8 pp.

(Continued)

*Primary Examiner* — Christopher Garft
(74) *Attorney, Agent, or Firm* — Merchant & Gould P.C.

(57) ABSTRACT

A mounting system for suspending an enclosure from an aerial strand at a location near a pole is disclosed. The mounting system includes a hanger arrangement configured to clamp to the aerial strand with the enclosure hung below the aerial strand at a location where a center of gravity of the enclosure is laterally offset from the aerial strand such that a weight of the enclosure generates torque about the aerial strand. The mounting system includes a rod for securement to the hanger arrangement and to the pole for transferring the torque generated by the weight of the enclosure from the hanger arrangement to the pole such that the enclosure is prevented from rotating about the aerial strand toward a position where the center of gravity of the enclosure is located directly beneath the aerial strand.

12 Claims, 11 Drawing Sheets

(56) References Cited

U.S. PATENT DOCUMENTS

| | | | |
|---|---|---|---|
| 3,240,863 A * | 3/1966 | Brede | H02G 7/205 |
| | | | 174/45 R |
| 4,570,884 A * | 2/1986 | Armbruster | F16L 3/22 |
| | | | 248/218.4 |
| 4,721,830 A | 1/1988 | Dagan et al. | |
| 4,994,630 A | 2/1991 | Schilling | |
| 5,133,039 A | 7/1992 | Dixit | |
| 5,668,911 A | 9/1997 | Debortoli | |
| 5,886,300 A | 3/1999 | Strickler | |
| 5,897,081 A * | 4/1999 | Dechen | H02G 1/02 |
| | | | 174/41 |
| 6,142,434 A * | 11/2000 | Trost | E04H 12/24 |
| | | | 24/270 |
| 6,279,879 B1 * | 8/2001 | Statz | E04H 17/1413 |
| | | | 248/219.2 |
| 7,048,490 B2 | 5/2006 | Henderson | |
| 7,566,170 B2 | 7/2009 | Halsmer et al. | |
| 7,660,508 B2 | 2/2010 | Mures et al. | |
| 2004/0261264 A1 | 12/2004 | Swindell et al. | |
| 2012/0175482 A1 | 7/2012 | Allen | |
| 2016/0033056 A1 | 2/2016 | Bishop et al. | |
| 2016/0107541 A1 * | 4/2016 | Formenti | B60M 1/20 |
| | | | 248/63 |

OTHER PUBLICATIONS

"Cable Lashing Clamp," TVO Communications, Retrieved Date: Dec. 17, 2010, From URL: http://www.tvcinc.com/hardware/cable-shasing-clamp/, 1 pg.

"Fiber Optic Splice Closures Mounting Hardware," Tyco Electronics, F616, Nov. 2007, 1 pp.

"FOSC 400 Ordering Guide for Closures and Accessories," 32 pp. (Admitted prior art.).

"FOSC 450 Gel-Sealed Fiber Optic Splice Closure Ordering Guide," Tyco Electronics Corporation, © 2004-2009 F429. Nov. 2009, 3 pp.

Exhibit A, FOSC 400B Closure with Pole Mount Kit, 2 pp. (Admitted prior art.).

Exhibit B, FOSC 400B Closure with Strand Mount Kit 2 pp. (Admitted prior art.).

Notification Concerning Transmittal of International Preliminary Report on Patentability in Corresponding PCT Application No. PCT/US2012/020431 dated Jul. 18, 2013, 10 pp.

Notification of Transmittal of the International Search Report and the Written Opinion of the International Searching Authority, or the Declaration in corresponding PCT Application No. PCT/US2012/020431 dated Apr. 16, 2013; 12 pp.

* cited by examiner

MOUNTING SYSTEM AND KIT FOR AERIAL MOUNTING OF A FIBER OPTIC ENCLOSURE

CROSS REFERENCE TO RELATED APPLICATIONS

This application is a continuation of U.S. patent application Ser. No. 14/960,687, filed Dec. 7, 2015, now U.S. Pat. No. 9,939,602; which claims priority to U.S. Provisional Patent Application Ser. No. 62/089,492, filed Dec. 9, 2014, the disclosures of which are incorporated herein by reference in their entireties.

TECHNICAL FIELD

The present disclosure relates generally to mounting configurations for mounting fiber optic enclosures to aerial strands.

BACKGROUND

Aerial routing configurations are commonly used to distribute fiber optic cables to various locations within a fiber optic network. In a typical aerial routing configuration, fiber optic cables are lashed to metal strands (e.g., metal wires or cables) that are routed aerially from power pole to power pole. At various locations throughout the fiber optic network, it is desirable to access optical fibers of the fiber optic cables (e.g., for splicing to drop cables). At typical access locations, cable jackets of the fiber optic cables are cut and/or removed to provide access to the optical fibers. The access locations are typically housed within sealed, re-enterable protective enclosures that frequently contain fiber optic components such as splice trays. In a typical application, a fiber optic cable is routed through a fiber optic enclosure and within the fiber optic enclosure one or more of the optical fibers is accessed for splicing to a drop cable. It is frequently desirable to aerially mount the fiber optic enclosures. There exists a need to provide enhanced configurations for aerially mounting fiber optic enclosures.

SUMMARY

To enhance access for a re-enterable aerial fiber optic enclosure, it is desirable to mount such aerial enclosure at a location below and laterally offset from its corresponding aerial strand. With the fiber optic enclosure mounted below and laterally offset from the strand, the center of gravity of the fiber optic enclosure is offset from the strand thereby causing torque to be applied to the strand. Generally, the strand lacks the structural strength to resist this type of torque and therefore twists in response to the torque such that the fiber optic enclosure moves to a position directly beneath the strand where the center of gravity of the fiber optic enclosure passes through the strand. Aspects of the present disclosure relate to aerial mounting configurations that provide torque resistance that prevents rotational movement of the fiber optic enclosure about the strand such that the center of gravity of the fiber optic enclosure can remain laterally offset from the strand (i.e., the fiber optic enclosure does not rotate downwardly directly beneath the strand). In this way, to enhance accessibility, the fiber optic enclosure can be effectively hung below and laterally offset from it corresponding aerial strand.

Teachings of the present disclosure relate to a mounting configuration for hanging an enclosure at a location laterally offset from a corresponding aerial strand that allows torque generated by the weight of the enclosure to bypass the strand (i.e., not be applied to the strand). In this way, the strand is prevented from twisting and the enclosure remains laterally offset from the strand. In one example, a rod can be used to transfer the torque generating force corresponding to the weight of the offset enclosure to a nearby pole. In other words, the rod and the pole cooperate to provide a reactive force that opposes the force vector about the strand corresponding to weight of the offset enclosure such that the net torque applied to the strand is zero. In certain examples, the rod can be cut to length to accommodate a desired offset distance between the enclosure and the pole.

Teachings of the present disclosure relate to a mounting system for suspending an enclosure from an aerial strand at a location near a pole. The mounting system includes a hanger arrangement that clamps to the aerial strand and that hangs the enclosure below the aerial stand at a location where a center of gravity of the enclosure is laterally offset from the aerial strand. The mounting system also includes a rod that is secured to the hanger arrangement and to the pole for preventing the enclosure from rotating about the aerial strand toward a position where the center of gravity of the enclosure is located directly beneath the aerial strand.

One aspect of the present disclosure relates to a method for suspending an enclosure from an aerial strand at a location near a pole. The method includes hanging the aerial strand at a location where a center of gravity of the enclosure is laterally offset from the aerial strand such that a weight of the enclosure generates a torque force relative to the aerial strand; and transferring the torque force generated by the weight of the enclosure to the pole with an anti-rotation rod such that the enclosure is prevented from rotating about the aerial strand toward a position where the center of gravity of the enclosure is located directly beneath the aerial strand.

Another aspect of the present disclosure relates to a mounting system for suspending an enclosure from an aerial strand. The mounting system includes a hanger assembly having a cradle component. The cradle component can have a first leg, a second leg that defines a proximal end and a distal end. The second leg can extend perpendicularly to the first leg at the proximal end. The cradle component can have a hook member at the distal end of the second leg for holding the enclosure. The first leg of the cradle component can be mountable to the aerial strand such that the enclosure is positioned in an off-set position to the aerial strand. The mounting system includes a bracket assembly that can be connected to a pole. The bracket assembly includes a mounting plate and extensions extending perpendicularly from the mounting plate. The mounting plate can define an elongated slot for receiving a fastener therein. The bracket assembly includes an L-shaped bracket having a horizontal member, a vertical member, and a joint member disposed between the horizontal and vertical members. The horizontal member can define a first slot and the vertical member can define a second slot. The bracket assembly further includes an elbow bracket having a short flange and a long flange at a substantially right angle to each other. The short and long flanges each can have an outside surface and an inside surface. The short flange of the elbow bracket can include a first slot opening and a second slot opening for receiving the fasteners. The long flange of the elbow bracket can define a plurality of holes. U-bolts can be disposed on the hanger assembly and adjacent the outside surface of the long flange of the elbow bracket. The U-bolts can define openings having a diameter selected to define a close fit with a rod inserted therethrough for providing anti-rotation movement of the enclosure about the aerial strand. The first slot of the horizontal member can be arranged and configured to align with the elongated slot of the mounting plate such that the fastener is inserted therethrough both the elongated slot of the mounting plate and the first slot of the horizontal member to secure the L-shaped bracket to the mounting plate. The vertical member of the L-shaped bracket can be mounted adjacent to the outside surface of the short flange of the elbow bracket such that the first and second slot openings align with the second slot of the vertical member where the fastener can be inserted therethrough for coupling the short flange of the elbow bracket to the vertical member of the L-shaped bracket.

A further aspect of the present disclosure relates to a mounting system kit including a hanger assembly for suspending an enclosure from an aerial strand. The hanger assembly including cradle components sized to hold the enclosure. The kit can include a bracket assembly connected to a pole where the bracket assembly includes a mounting plate for securing the bracket assembly to the pole; an L-shaped bracket mounted against the mounting plate by a fastener; an elbow bracket held against the L-shaped bracket by the fastener; and U-bolts disposed along an outside surface of the elbow bracket and the hanger assembly. The U-bolts can define a hole having a diameter selected to define a close fit with a rod inserted therethrough for providing anti-rotation movement of the enclosure about the aerial strand. The mounting system can be constructed to suspend the enclosure off-set from the aerial strand.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
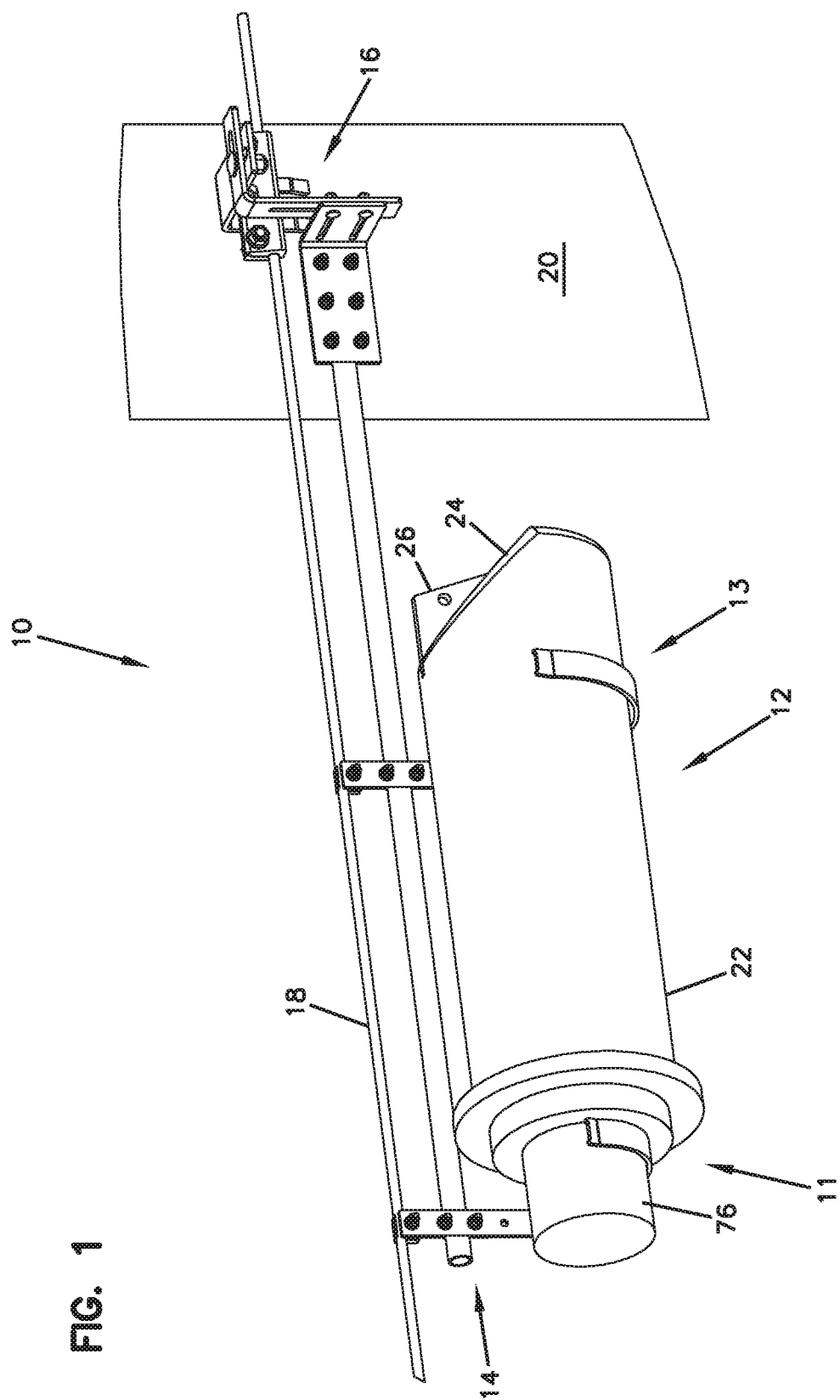
FIG. 1 is a perspective view of a mounting system including an enclosure, a hanger assembly, and a retention bracket arrangement in accordance with the principles of the present disclosure.

FIG. 1 illustrates a mounting system 10 (e.g., component) for suspending an enclosure 12 (e.g., splice enclosure) from an aerial strand 18 in an off-set position at a location near a post 20, a hanger arrangement 14 (e.g., cradle components), and a retention bracket arrangement 16 in accordance with the principles of the present disclosure. In one example, the enclosure 12 is a single-ended dome style closure that can be mounted on the hanger arrangement 14 to secure the enclosure 12 to an elongate support substrate, such as a messenger cable or the aerial strand 18. The enclosure 12 may be formed of a thermoplastic polymeric material, for example. In some examples, the enclosure 12 may be formed of a metal such as steel. In some examples, the enclosure 12 may be about 24 inches (in) long by 9.8 inches (in) diameter. In other examples, the enclosure 12 may be about 30 in. long by about 11.5 in. diameter. In still other examples, the enclosure 12 may be about 19 in. long by about 8 in. diameter. It will be appreciated that the length and diameter of the enclosure 12 may vary with other examples.

The aerial strand 18 may be of any suitable construction. The strand may include only one unitary cable strand or filament or may be comprised of a plurality of strands or filaments helically tested about one another. For example, the aerial strand 18 may be formed of any suitable material, such as steel. In some examples, the aerial strand 18 can have an outer diameter in the range of from about 0.25 to 0.5 inches. In another example, the aerial strand 18 may be secured to the post 20 (e.g., pole) by the retention bracket arrangement 16. The retention bracket arrangement 16 is illustrated and described in more detail with reference to FIGS. 2-3.

The enclosure 12 includes a base 22, a removable dome 24 that attaches to the base 22, and a clamp 26 (e.g., v-band clamp) for securing the removable dome 24 to the base 22. Closure splice and storage compartments are accessible via the removable dome 24. One or more cables may be stored within the enclosure 12. In one example, the cables are data transmission cables. In another example, the cables are fiber optic telecommunication cables. In other examples, the cables are copper telecommunication cables. In still other examples, the cables are telephone and/or CATV cables. In one example, the removable dome 24 can be one piece such that one end slides into the base 22 and is clamped thereon. In one example, the orientation of the enclosure 12 may be directed towards the post 20 while being parallel to the aerial strand 18. In other examples, the orientation of the enclosure 12 may be directed away from the post 20 while being parallel to the aerial strand 18 by reversing the hanger arrangement 14.

Figure 2:
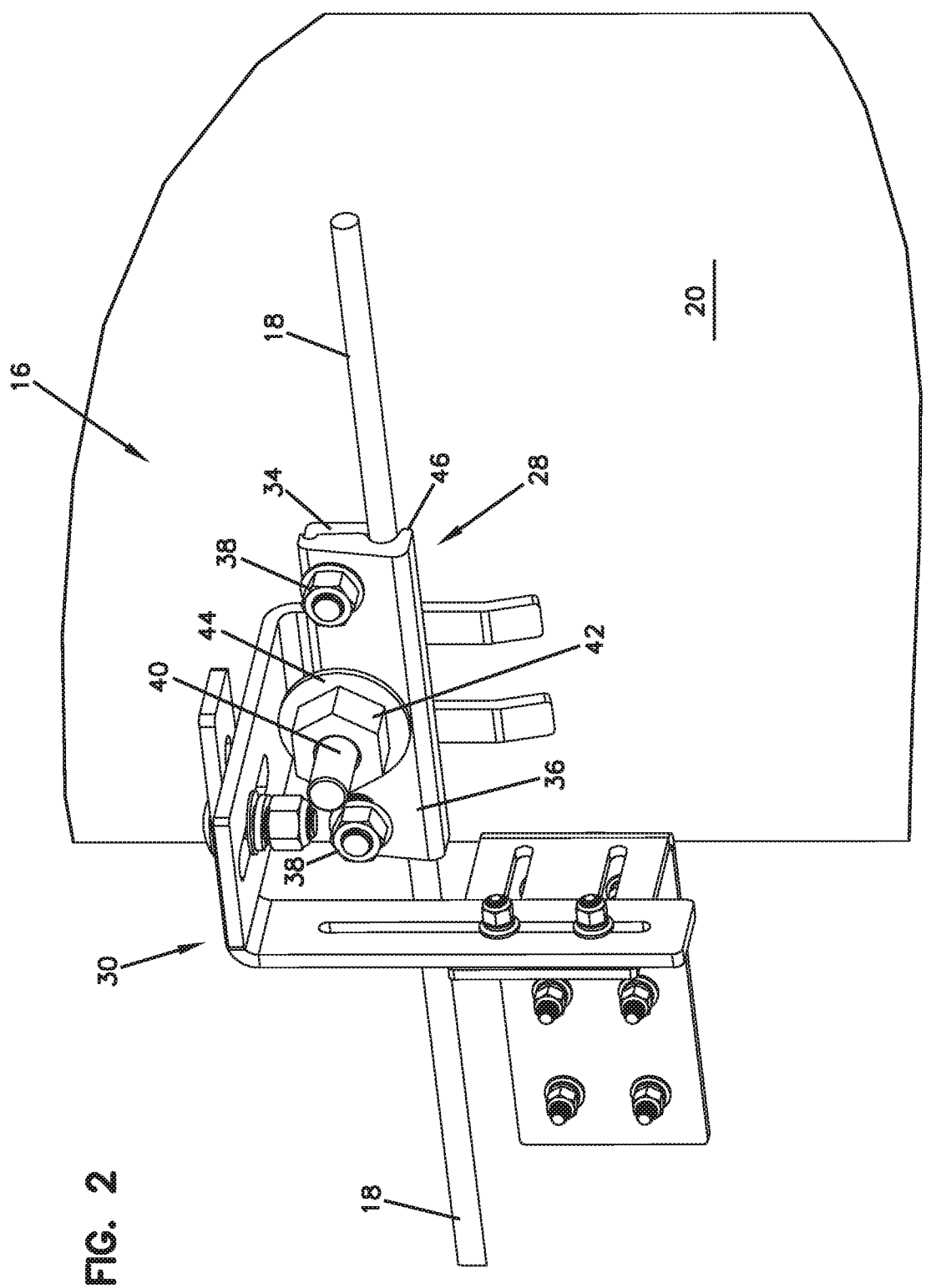
FIG. 2 is an enlarged perspective view of the retention bracket arrangement of FIG. 1 in accordance with the principles of the present disclosure.
Figure 3:
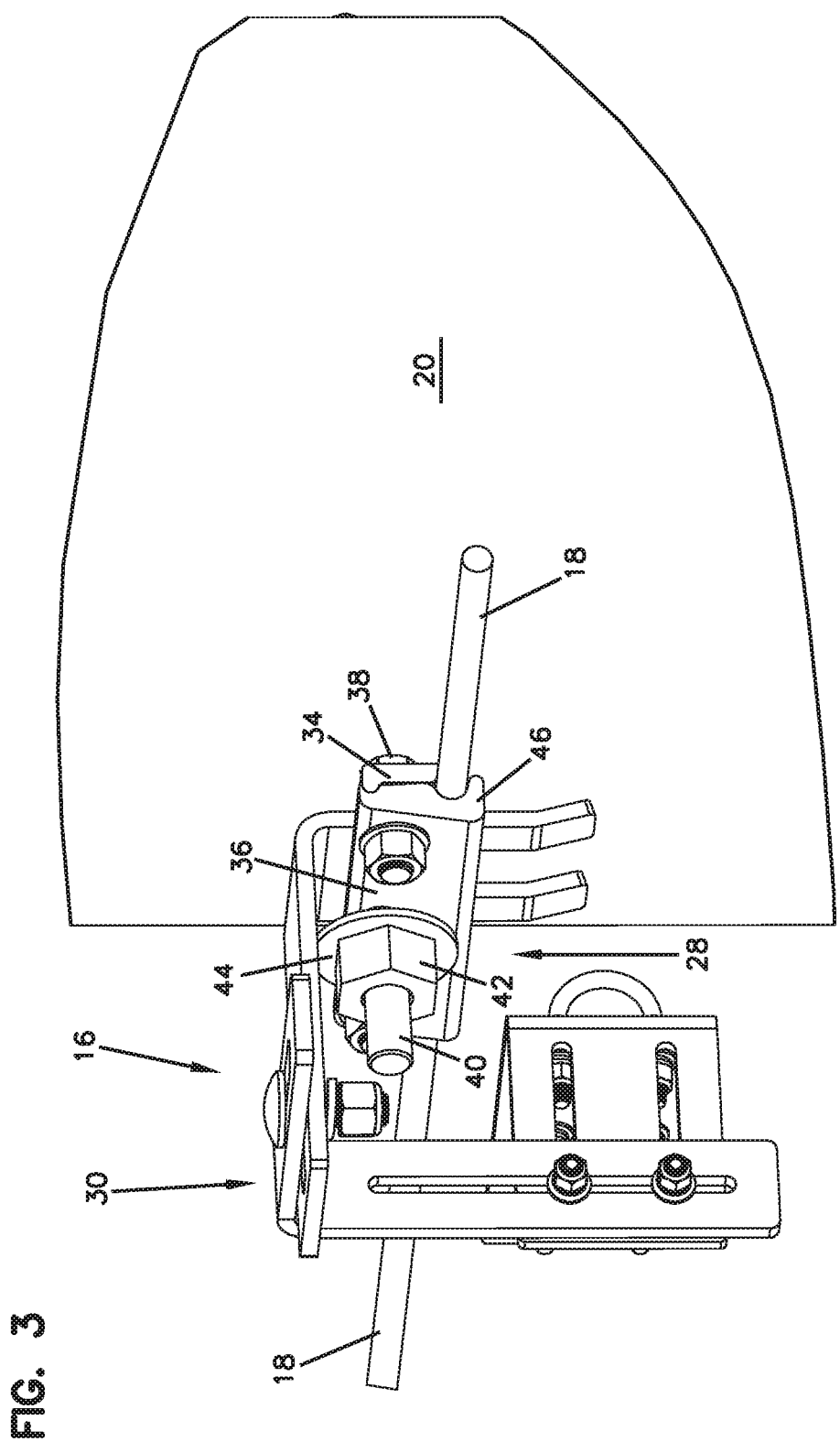
FIG. 3 is another perspective view of the retention bracket arrangement of FIG. 2 in accordance with the principles of the present disclosure.

Referring to FIGS. 2-3, an example retention bracket arrangement 16 is shown. The retention bracket arrangement 16 includes a strand clamp 28 (e.g., strand mount) for securing the aerial strand 18 to the post 20 and a bracket arrangement 30 for securing a rod or anti-rotation pipe 32 (see FIG. 7) to the post 20. The bracket arrangement 30 is illustrated and described in more detail with reference to FIGS. 9-11.

In one example, the strand clamp 28 includes a first mounting plate 34 and a second mounting plate 36. The first and second mounting plates 34, 36 can be secured together by fasteners 38. In some examples, a bolt 40 having a cap screw 42 and washer 44 can be used to secure the strand clamp 28 to the post 20. The stand clamp 28 can include a first strand grip protrusion 46 that mounts the aerial strand 18 between the first and second mounting plates 34, 36 of the strand clamp 28.

Figure 4:
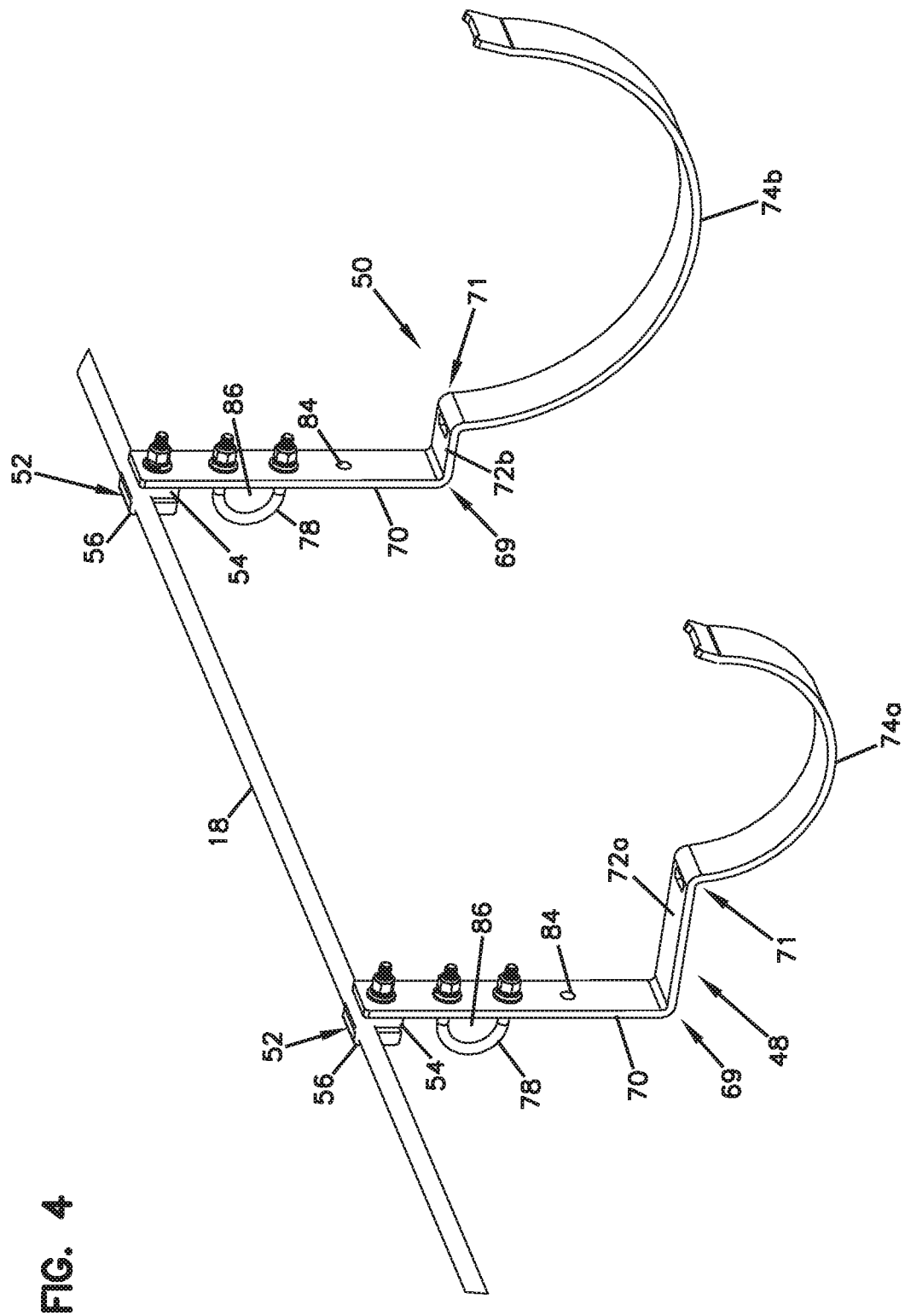
FIG. 4 is a perspective view of the hanger assembly of FIG. 1 installed in an upper U-bolt location in accordance with the principles of the present disclosure.
Figure 5:
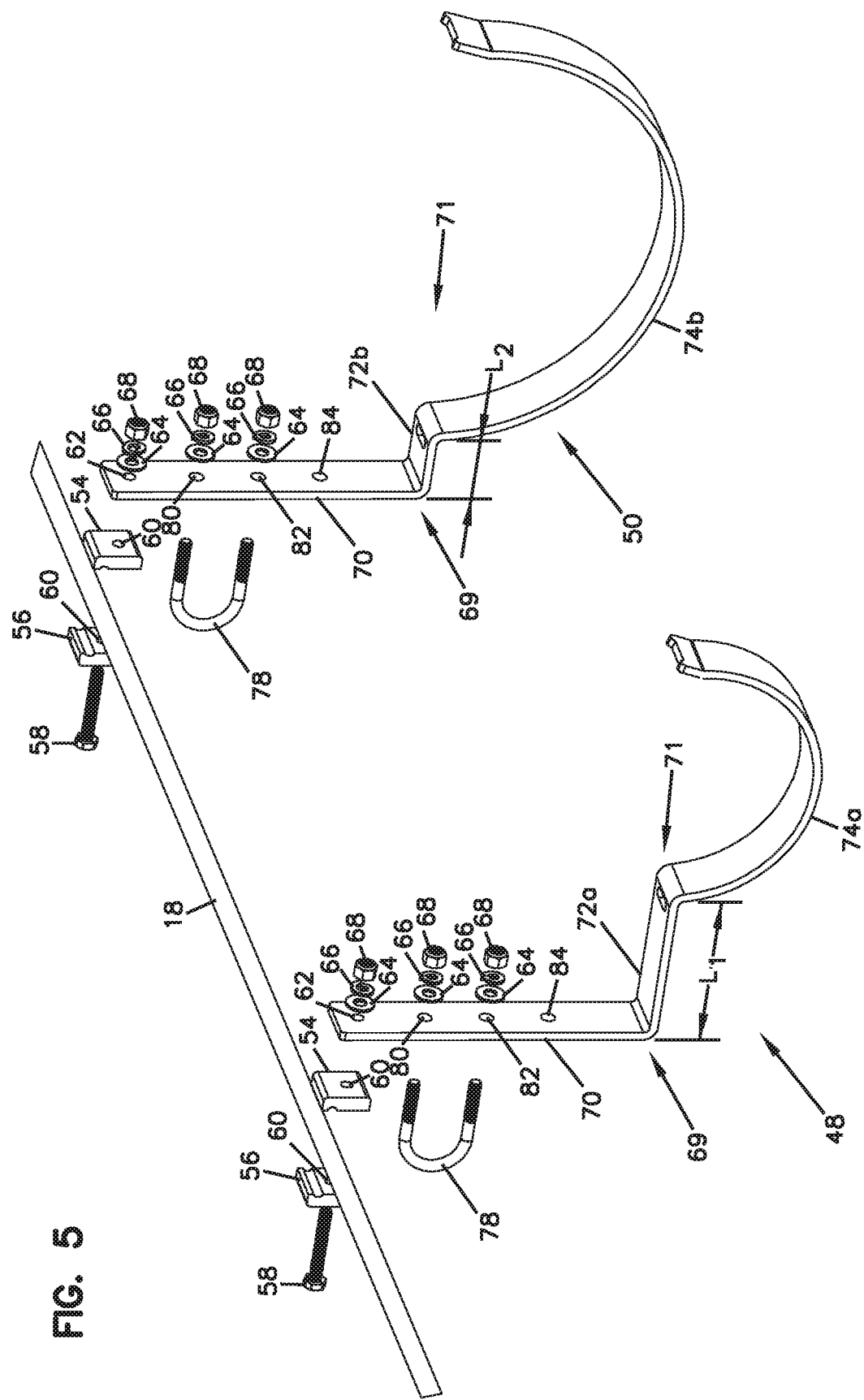
FIG. 5 is an exploded view of FIG. 4.

Referring to FIGS. 4-5, the hanger arrangement 14 is shown without the enclosure 12. The hanger arrangement 14 may be configured to clamp to the aerial strand 18 with the enclosure 12 hung below the aerial strand 18 at a location where a center of gravity of the enclosure 12 is laterally offset from the aerial strand. The hanger arrangement 14 includes J-shaped cradles 48 and 50 (e.g., offset cradles) for supporting the enclosure 12. The J-shaped cradles 48 and 50 may be used to secure the enclosure 12 to the aerial strand 18 by, for example, attachment devices 52 such as, but not limited to, clamps, zips ties, or nuts. It will be appreciated that other types of fastening or coupling devices may be used.

In certain examples, the attachment devices 52 may each include a pair of opposed clamp plates 54, 56 connected by fasteners 58. The fasteners 58 can be received within first openings 60 defined by each of the opposed clamp plates 54, 56. The fasteners 58 can be used to couple the attachment devices 52 to the J-shaped cradles 48, 50 through first holes 62 of the J-shaped cradles 48, 50. The fasteners 58 can secured to the J-shaped cradles 48, 50 by a flat washer 64, a split lock washer 66, and a nut 68. Each attachment device 52 enables the respective associated J-shaped cradled 48, 50 to be coupled to the aerial strand 18.

In certain examples, the J-shaped cradles 48, 50 can each include a first leg 70, a second leg 72 having a proximal end 69 and a distal end 71 extending perpendicularly to the first leg 70 and a hook member 74 located at the distal end 71 of the second leg 72. The J-shaped cradle 48 includes a second leg 72a that has a length $L_1$ longer than a length $L_2$ of the second leg 72b of the J-shaped cradle 50. The hook 74a of the J-shaped cradle 48 is also smaller than the hook 74b of the J-shaped cradle 50. The hook 74a can be adapted to receive a shaft 76 (see FIG. 1) of the enclosure 12 and the hook 74b can be adapted to receive the base 22 of the enclosure 12. In certain examples, the J-shaped cradles can be fastened to the enclosure 12 to prevent the enclosure 12 from falling out. It will be appreciated that the hook 74 can be fabricated in a variety of sizes.

In one example, the enclosure 12 can be positioned between about 2 inches to about 10 feet from the post 20. The J-shaped cradles 48, 50 can be positioned respectively at first and second ends 11, 13 (see FIG. 1) of the enclosure 12. The J-shaped cradles 48, 50 can hold the enclosure 12 such that the enclosure 12 can be positioned off-set from the aerial strand 18. When in the off-set position, the aerial strand 18 can be positioned behind the enclosure 12. In certain examples, the aerial strand 18 can flex and move thereby making the enclosure 12 want to gravitate downwardly. In one example, the enclosure 12 may have a tendency to gravitate downwardly such that the enclosure 12 moves in a position below the aerial strand 18.

The pipe 32 may be secured to the hanger arrangement 14 and to the post 20 for preventing the enclosure 12 from rotating about the aerial strand 18 toward a position where the center of gravity of the enclosure 12 is located directly beneath the aerial strand 18. In certain examples, the pipe 32 may be used to transfer the torque generating force corresponding to the weight of the enclosure 12 to the post 20. For example, the pipe 32 and the post 20 may cooperate to provide a reactive force that opposes the force vector about the aerial strand 18 corresponding to weight of the enclosure 12 such that the net torque applied to the aerial strand 18 is zero.

In one example, the pipe 32 may be attached to the hanger arrangement 14 by U-bolts 78. In other examples, the pipe 32 may be attached to the hanger arrangement 14 at a location vertically between the aerial strand 18 and the J-shaped cradles 48, 50. The enclosure 12 may be prevented from rotating about the aerial strand 18 toward a position where the center of gravity of the enclosure 12 is located directly beneath the aerial strand 18. In some examples, the pipe 32 may be mounted parallel to the aerial strand 18.

Figure 6:
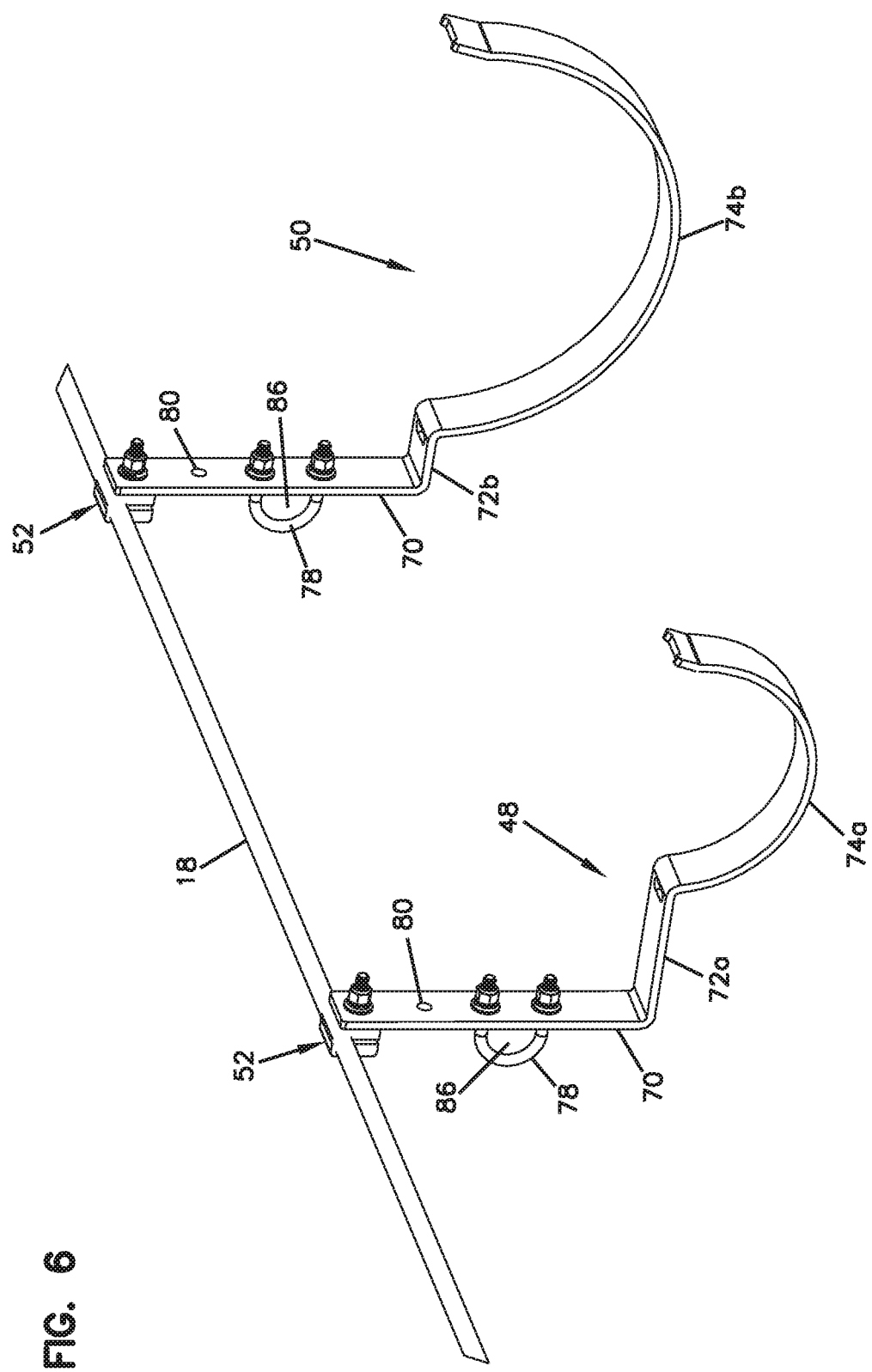
FIG. 6 is a perspective view of the hanger assembly of FIG. 4 installed in a lower U-bolt location in accordance with the principles of the present disclosure.

The pipe 32 may be cut to a desired length that corresponds to a desired offset distance between the enclosure 12 and the post 20. In one example, the pipe 32 may be a ¾ inch pipe having 10 feet length sections. In other examples, the pipe 32 may be less than 10 feet in length prior to cutting. The pipe 32 can be attached to the J-shaped cradles 48, 50 by the U-bolts 78. The U-bolts 78 can be designed to be inserted into second holes 80 and third holes 82 of the first leg 70 of the J-shaped cradles 48, 50. The U-bolts 78 can be secured to the first leg 70 of the J-shaped cradles 48, 50 by the flat washer 64, the split lock washer 66, and the nut 68. In other examples, the U-bolts 78 can be designed to be inserted into the third holes 82 and fourth holes 84 of the first leg 70 of the J-shaped cradles 48, 50 as shown in FIG. 6. In one example, the U-bolts 78 define an opening 86 (e.g., a hole) having a diameter selected to define a close fit with the pipe 32 inserted therethrough.

Figure 7:
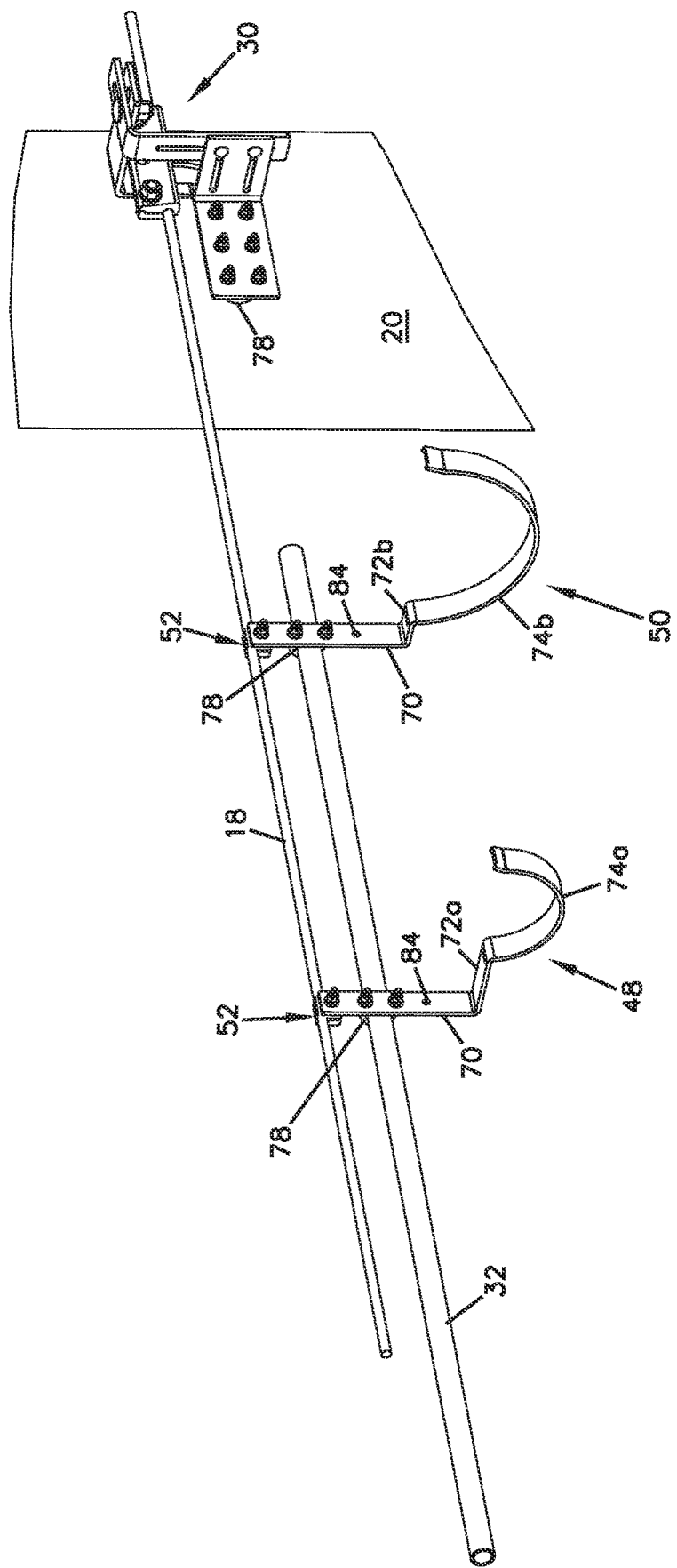
FIG. 7 is a perspective view of a pipe being installed in the mounting system in accordance with the principles of the present disclosure.

Referring to FIG. 7, the pipe 32 is shown being installed. The pipe 32 can be secured to the post 20 through the strand clamp 28 via the bracket arrangement 30 that attaches to the strand clamp 28. The pipe 32 can extend any distance desired from the post 20. The pipe 32 can be inserted within the opening 86 of the U-bolts 78.

Figure 8:
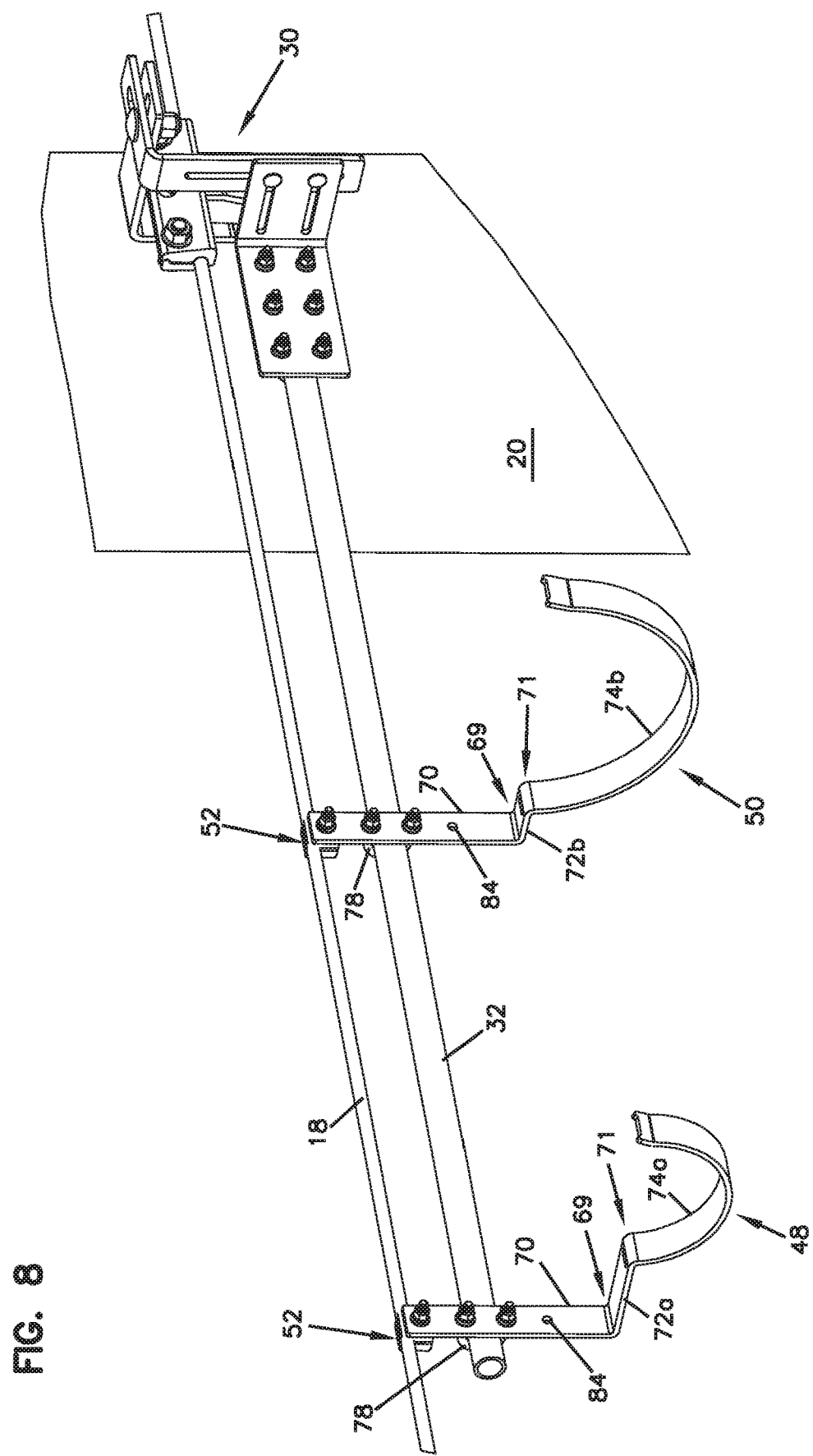
FIG. 8 is a perspective view of the pipe being fully installed attached to the hanger assembly and pole.

Referring to FIG. 8, the pipe 32 is shown fully inserted and attached to both the J-shaped cradles 48, 50 and the post 20. The pipe 32 can help to eliminate rotation of the enclosure 12 about the aerial strand 18 such that the pipe 32 provides anti-rotation movement of the enclosure 12. The pipe 32 can be positioned adjacent to and parallel to the aerial strand 18. In one example, the pipe 32 can be positioned against the aerial strand 18. In other examples, the pipe 32 can be a distance below the aerial strand 18. In either position, the enclosure 12 is off-set from the aerial strand 18.

Figure 9:
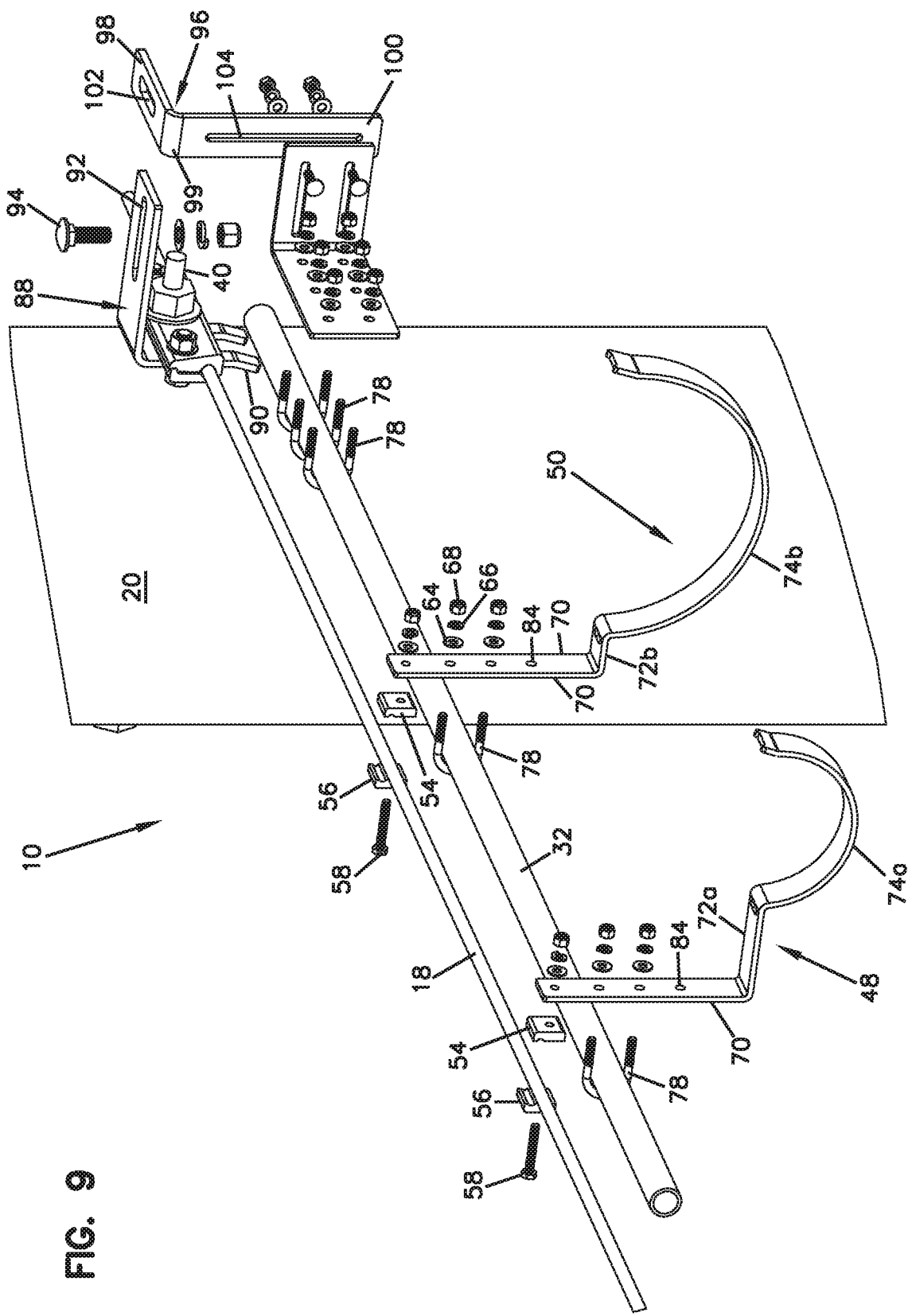
FIG. 9 is an exploded view of FIG. 8.

Referring to FIG. 9, the mounting system 10 is shown in an exploded view. The bracket arrangement 30 can include a mounting plate 88 and extensions 90 extending perpendicularly from the mounting plate 88. The mounting plate 88 defines an elongated slot 92 for receiving a flat head bolt 94 therein. The extensions 90 of the mounting plate 88 can be arranged and configured to slide behind the strand clamp 28 to secure the mounting plate 88 to the post 20. The bolt 40 may be used to tighten the strand clamp 28 against the extensions 90 of the mounting plate 88 adjacent to the post 20.

Figure 10:
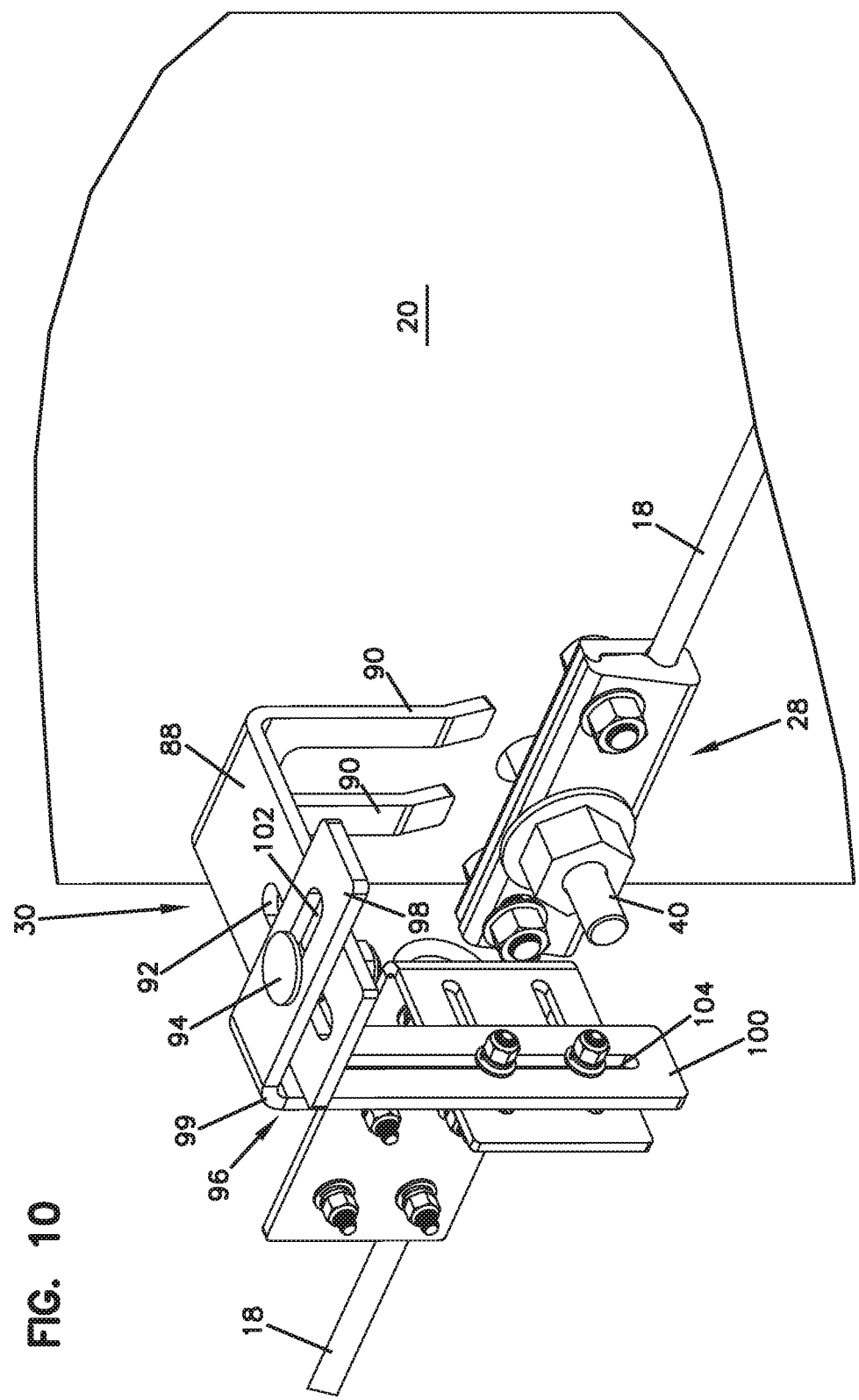
FIG. 10 is an enlarged view of a bracket assembly being inserted between a strand clamp and the pole in accordance with the principles of the present disclosure.

Referring to FIG. 10, shows an enlarged view of the bracket arrangement 30 being inserted between the strand clamp 28 and the post 20. In one example, the bracket arrangement 30 further includes an L-shaped bracket 96 that can be coupled to the mounting plate 88 at the elongated slot 92. The L-shaped bracket 96 can include a horizontal member 98 and a vertical member 100 joined together by a joint member 99. In the depicted example, the horizontal member 98 defines a first slot 102 and the vertical member 100 defines a second slot 104. The horizontal member 98 can be arranged and configured such that the first slot 102 aligns with the elongated slot 92 such that the flat head bolt 94 can be inserted within both the elongated slot 92 and the first slot 102 to secure the L-shaped bracket 96 to the mounting plate 88. In the depicted example, the horizontal member 98 is positioned across the mounting plate 88 in a T-shape like configuration.

Figure 11:
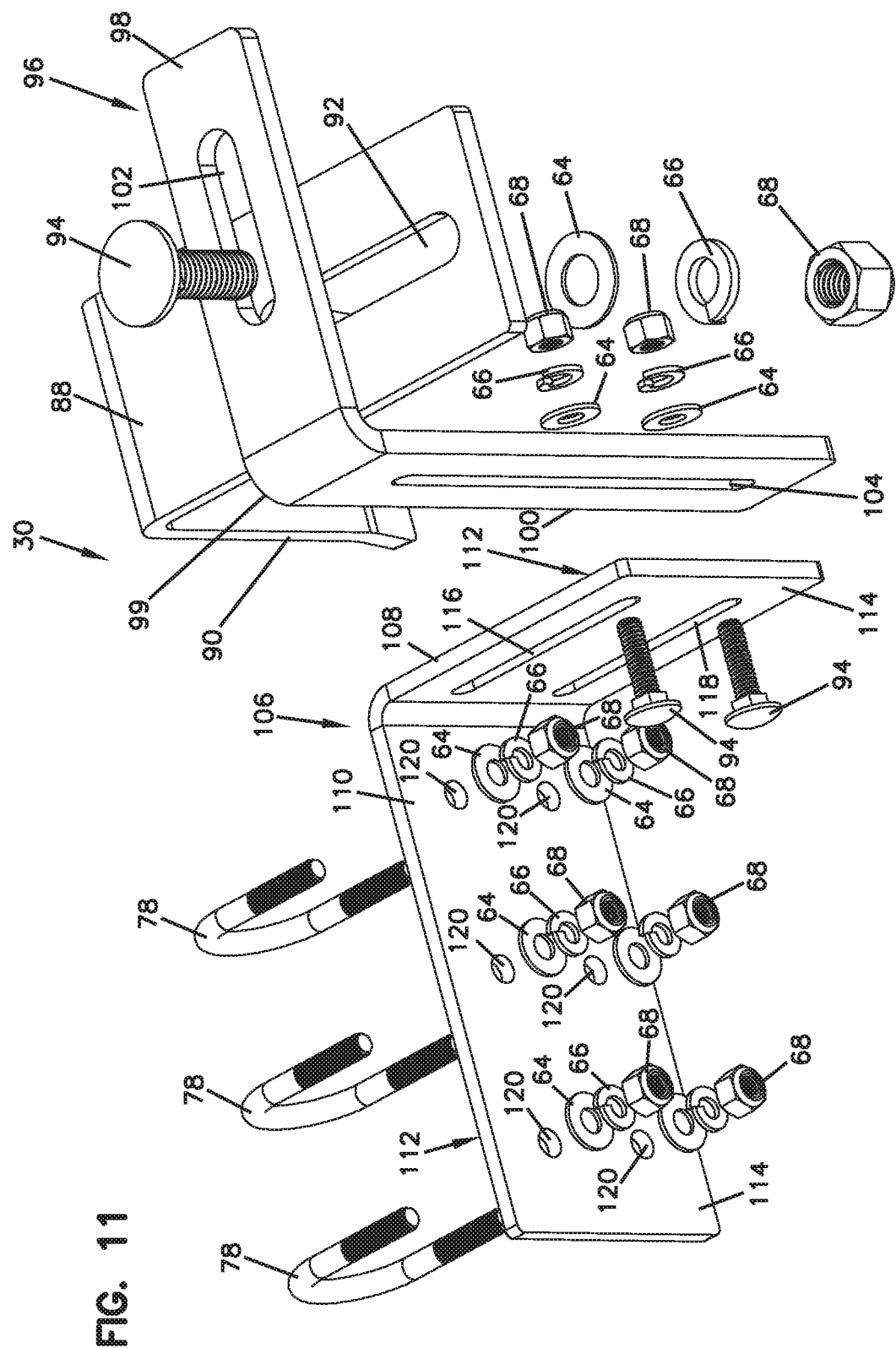
FIG. 11 is an exploded view of the bracket assembly.

Referring to FIG. 11, an enlarged exploded view of the bracket arrangement 30 is shown. The bracket arrangement 30 includes an elbow bracket 106 having a short flange 108 and a long flange 110 at a substantially right angle to each other and having an outside surface 112 and an inside surface 114. The vertical member 100 of the L-shaped bracket 96 can be mounted adjacent to the outside surface 112 of the short flange 108 of the elbow bracket 106. The short flange 108 includes a first slot opening 116 and a second slot opening 118 for receiving flat head bolts 94. The flat head bolts 94 can be arranged and configured to engage the second slot 104 of the vertical member 100 for coupling the short flange 108 of the elbow bracket 106 to the vertical member 100 of the L-shaped bracket 96. The flat head bolts 94 are secured by coupling together the flat washer 64, the split lock washer 66, and the nut 68.

The long flange 110 of the elbow bracket 106 defines a plurality of holes 120 for receiving a row of U-bolts 78. The U-bolts 78 can be secured to the long flange 110 with the flat washers 64, the split lock washers 66, and the nuts 68. In certain examples, the pipe 32 can be mounted to the outside surface 112 of the long flange 110 of the elbow bracket 106 within openings 86 of the U-bolts 78.

Another aspect of the disclosure relates to a method for suspending the enclosure 12 from the aerial strand 18 at a location near the post 20. The method can include the steps of hanging the aerial strand 18 at a location where a center of gravity of the enclosure 12 is laterally offset from the aerial strand 18 where a weight of the enclosure 12 can generate torque about the aerial strand 18. The method also can include the step of transferring the torque that can be generated by the weight of the enclosure 12 to the post 20 with the anti-rotation pipe 32 such that the enclosure 12 is prevented from rotating about the aerial strand 18 toward a position where the center of gravity of the enclosure 12 is located directly beneath the aerial strand 18.

From the forgoing detailed description, it will be evident that modifications and variations can be made without departing from the spirit and scope of the disclosure.

What is claimed is:

1. A mounting system for suspending an enclosure from an aerial strand at a location near a pole, the enclosure including a base and a removable dome that attaches to the base to store one or more cables, the mounting system comprising:
  a retention bracket arrangement for securing the aerial strand to the pole with the enclosure being offset vertically from the aerial strand; and
  an anti-rotation pipe secured to the pole via the retention bracket arrangement, the anti-rotation pipe having a main body, the main body including a first end that terminates at the enclosure and a second end that terminates at the pole, and the main body of the anti-rotation pipe having a length that extends from the first end to the second end;
  wherein the retention bracket arrangement includes a strand clamp and a bracket arrangement, wherein the bracket arrangement includes a mounting plate with extensions extending perpendicularly from the mounting plate, an L-shaped bracket, and an elbow bracket.

2. The mounting system of claim 1, wherein the main body of the anti-rotation pipe is spaced from and generally parallel to the aerial strand.

3. The mounting system of claim 1, wherein the main body of the anti-rotation pipe is positioned parallel to the aerial strand.

4. The mounting system of claim 1, further comprising a hanger arrangement adapted to clamp to the aerial strand via attachment devices, the hanger arrangement including offset cradles for supporting the enclosure relative to the aerial strand.

5. The mounting system of claim 4, wherein the anti-rotation pipe attaches to the hanger arrangement at a location vertically between the aerial strand and the offset cradles.

6. The mounting system of claim 1, wherein the aerial strand is attached to the pole by the strand clamp that clamps to the aerial strand, and wherein the anti-rotation pipe attaches to the pole through the strand clamp via the bracket arrangement that attaches to the strand clamp.

7. The mounting system of claim 1, wherein the anti-rotation pipe is configured to be cut to a desired length that corresponds to a desired offset distance between the enclosure and the pole.

8. The mounting system of claim 7, wherein the anti-rotation pipe is a ¾ inch pipe with less than 10 feet in length prior to cutting.

9. The mounting system of claim 4, wherein the anti-rotation pipe attaches to the offset cradles of the hanger arrangement via U-bolts such that the anti-rotation pipe is generally parallel to the aerial strand.

10. The mounting system of claim 9, wherein the attachment devices and the U-bolts are adjacent to each other such that one is above the other.

11. The mounting system of claim 1, wherein the enclosure is positioned in an offset position to the aerial strand.

12. A mounting system for suspending an enclosure from an aerial strand at a location near a pole, the enclosure including a base and a removable dome that attaches to the base to store one or more cables, the mounting system comprising:
  a retention bracket arrangement for securing the aerial strand to the pole with the enclosure being offset vertically from the aerial strand;
  an anti-rotation pipe secured to the pole via the retention bracket arrangement, the anti-rotation pipe having a main body, the main body including a first end that terminates at the enclosure and a second end that terminates at the pole, and the main body of the anti-rotation pipe having a length that extends from the first end to the second end; and
  a hanger arrangement adapted to clamp to the aerial strand via attachment devices, the hanger arrangement including offset cradles for supporting the enclosure relative to the aerial strand.

* * * * *